United States Patent Office 3,205,196
Patented Sept. 7, 1965

3,205,196
POLYMERS OF ETHYLENICALLY UNSATURATED HYDROCARBONS CONTAINING $C_{10}Cl_{10}O$ OR $C_{10}H_2O_3SCl_{12}$ AS FIRE RETARDANTS
Stephen M. Creighton, Niagara Falls, N.Y., assignor to Hooker Chemical Corporation, Niagara Falls, N.Y., a corporation of New York
No Drawing. Filed Jan. 30, 1961, Ser. No. 85,499
16 Claims. (Cl. 260—45.75)

This invention relates to novel fire retardant polymer compositions, and to methods for rendering polymeric materials fire retardant.

Polymeric materials are being used more widely every year in industrial applications such as wire coatings, pipes and conduits and for other industrial moldings and extruded products. These and other uses are better served by polymer compositions that are fire retardant and flame resistant. Prior art attempts to impart fire resistance to polymers by the use of additives have often adversely affected the desirable properties of the polymer.

Accordingly, it is an object of this invention to provide fire retardant polymer compositions. It is another object of this invention to provide methods for reducing the flammability of polymeric materials to the non-burning state. It is a further object to provide additives for polymeric materials that not only impart fire resistance but also enhance or preserve other physical properties of the polymer.

These and other objects are accomplished by providing polymer compositions comprising a polymeric material and a compound selected from the group consisting of $C_{10}Cl_{10}O$, $C_{10}H_2O_3SCl_{12}$, and mixtures thereof. The flame retardant characteristics of these polymer compositions are further improved by incorporating antimony compounds therein. Such compositions are found to have enhanced physical properties, such as heat distortion temperature, over the properties of the base resin.

The polymers embraced within the scope of this invention are the homopolymers and copolymers of unsaturated aliphatic, alicyclic and aromatic hydrocarbons. Suitable monomers are ethylene, propylene, butene, pentene, hexene, heptene, octene, 2-methylpropene-1, 3-methylbutene-1, 4-methylpentene-1, 4-methylhexene-1, 5-methylhexene-1, bicyclo-(2.2.1)-2-heptene, butadiene, pentadiene, hexadiene, isoprene, 2,3-dimethylbutadiene-1,3, 2-methylpentadiene - 1,3, 4-vinylcyclohene, vinylcyclohexene, cyclopentadiene, styrene and methylstyrene and the like.

Two of the polymers of this group, polyethylene and polystyrene, have long been known in the art. Low-density (0.92 gram/cc.) polyethylene is produced by the polymerization of ethylene at a pressure greater than twelve hundred atmospheres and at a temperature of one hundred to three hundred degrees centigrade. Lower pressures of about five hundred atmospheres can be used if a catalyst such as oxygen or benzoyl peroxide is added to the ethylene as described by Fawcett et al., Chem. Abs., 32, 1362 (1938).

Polystyrene is readily produced by mass, solution or emulsion polymerization as described in The Technology of Plastics and Resins, Mason, J. P., and Manning, J. F., van Nostrand Company (1945). The polymerization is promoted by the action of light and catalysts such as hydrogen peroxide, benzoyl peroxide and other organic peroxides. Suitable solvents for solution polymerization are toluene, xylene and chlorobenzene.

In recent years a new field of linear and stereoregular polymers has become available which are suitable for use in the instant invention. These polymers are produced with oragnometallic catalysts and supported metal oxide catalysts as disclosed in great detail in Linear and Stereoregular Addition Polymers: Polymerization With Controlled Propagation, Gaylord, N. G., and Mark, H. F., Interscience Publishers, Inc. (1959). Monomers of the type disclosed hereinbefore are readily polymerized to solid polymers in the presence of a catalyst system comprising aluminum triethyl and titanium tetrachloride or titanium trichloride. The reaction is carried out in the presence of an inert, hydrocarbon diluent, suitably purified of catalyst poisons, at a temperature in the range of fifty to two hundred and thirty degrees centigrade. At the conclusion of the reaction, the polymer can be recovered from the resulting solution or suspension by evaporation of the diluent, whereupon the polymer is treated for removal of catalyst residues, for example by washing with water or alcohol, and acids. Metal oxide catalysts such as chromium oxide supported on silica or alumina are suitable for polymerizing 1-olefins containing a maximum of eight carbon atoms, with no branching closer to the double bond than the 4-position. The polymerization is carried out in the manner described for the organometallic catalyst system.

The preparation of $C_{10}Cl_{10}O$ is disclosed in U.S. 2,616,928. Hexachlorocyclopentadiene and sulfur trioxide are mixed and digested for a short period to condense two molecules of hexachlorocyclopentadiene to form a liquid reaction product of hexachlorocyclopentadiene and sulfur trioxide. The reaction product is then hydrolyzed with an alkaline aqueous medium, after which the mixture is neutralized with sulfuric acid, whereupon the crystalline product precipitates. The reaction mixture is cooled to insure relatively complete precipitation of the product which is then separated from the mixture by filtration or centrifugation.

$C_{10}Cl_{10}O$ is also prepared by treating $C_{10}H_2O_3SCl_{12}$ with alcoholic alkali, followed by acidification. $C_{10}H_2O_3SCl_{12}$ is prepared by reacting hexachlorocyclopentadiene with chlorosulfonic acid at a temperature in the range of thirty to one hundred and seventy degrees centigrade as disclosed in U.S. 2,516,404.

An indirect method for incorporating $C_{10}Cl_{10}O$ into polymeric materials is to mix $C_{10}H_2O_3SCl_{12}$ into the polymeric material. At the elevated temperatures required for mixing, at least a major portion of the $C_{10}H_2O_3SCl_{12}$ decomposes to form $C_{10}Cl_{10}O$.

Antimony oxide is the antimony compound that is presently preferred for use in the present invention. However, many antimony compounds are suitable. Inorganic antimony compounds include antimony sulfide, sodium antimonite, potassium antimonate, and the like. Many organic antimony compounds are suitable such as the antimony salts of organic acids and their pentavalent derivatives disclosed in copending application Ser. No. 688,143, filed October 4, 1957, now Patent Number 2,996,528. Compounds of this class include antimony butyrate, antimony valerate, antimony caproate, antimony heptylate, antimony caprylate, antimony pelargonate, antimony caprate, antimony cinnamate, antimony anisate, and their pentavalent dihalide derivatives. Likewise the esters of antimonous acids and their pentavalent derivatives disclosed in copending application Ser. No. 688,108, filed October 4, 1957, now Patent Number 2,993,924, such as tris(n-octyl) antimonite, tris(2-ethylhexyl) antimonite, tribenxyl antimonite, tris ($\beta$-chloroethyl) antimonite, tris($\beta$-chloropropyl) antimonite, tris($\beta$-chlorobutyl) antimonite and their pentavalent compounds are the cyclic antimonites such as trimethylolpropane antimonite, pentaerythritol antimonite, and glycerol antimonite. The corresponding arsenic and bismuth compounds can also be employed.

The components comprising the compositions of the instant invention can be mixed by any one of several methods. The additives can be introduced into the polymer while the latter is dissolved in a suitable solvent. This procedure is especially useful when it is desired to mix the additives during the polymer manufacturing process. When the polymer is subsequently recovered from the solvent, the additives are intimately mixed with the polymer. Usually the additives are mixed with the polymer in the molten state at temperatures that can range from the melting point to the decomposition temperature of the polymer. Alternatively the additives and polymer are dry-blended in the finely divided state so that an intimate mixture is obtained upon subsequent molding or extrusion.

The chlorinated compounds of the instant invention are desirably incorporated in polymer materials in the range from about ten to about fifty percent by weight of the polymer composition, preferably from about twenty to about thirty-five percent by weight. The antimony compound can be used in amounts ranging from less than one to about thirty percent by weight of the polymer composition, preferably from about ten to about twenty percent by weight.

The invention is illustrated by the following examples which are not intended to limit the scope of the invention.

In these examples the properties of the molded polymer compositions were tested in accordance with standard ASTM test procedures as follows:

Heat distortion temperature___ ASTM D 648–56 (using 264 p.s.i. fiber stress).
Burning characteristics _____ ASTM D 635–56T.

In the latter test, a specimen can fall into one of three categories: (1) Burning (the rate is reported), (2) self-extinguishing upon removal of flame and (3) non-burning. In these examples, the length of time the specimens burned after the flame was removed is reported. Usually a range for several specimens is given.

EXAMPLE 1

A sample of polypropylene prepared by organometal-catalyzed polymerization of propylene was heated in the roller head of a Brabender Plastograph for about five minutes at two hundred to two hundred and five degrees centigrade and then discharged into a mold. The compression molded specimen had a heat distortion temperature of seventy-nine degrees centigrade and burned at a rate of 1.3 inches per minute.

EXAMPLE 2

Seventy parts by weight of the type of polypropylene used in Example 1 was mixed with thirty parts of $C_{10}Cl_{10}O$ in the roller head of the Plastograph for eight minutes at two hundred degrees centigrade and then discharged into a mold. The resulting compression molded specimen had a heat distortion temperature of eighty-five degrees centigrade and burned slowly at 0.64 inch per minute.

EXAMPLE 3

Seventy parts by weight of the polypropylene of Example 1 was mixed with twenty parts of $C_{10}Cl_{10}O$ and ten parts of antimony oxide using the conditions of Example 1. The resulting compression molded specimen had a heat distortion temperature of seventy-seven degrees centigrade and was self-extinguishing in five to eighteen seconds.

EXAMPLE 4

In the manner of Example 2, the incorporation into polypropylene of $C_{10}H_2O_3SCl_{12}$ imparts fire retardance to the polymer.

In the following examples, $C_{10}Cl_{10}O$ was incorporated in linear polyethylene produced by polymerizing ethylene in the presence of a supported chromium oxide catalyst. The mixing method was the same as in the preceding examples except that the mixing temperature was one hundred and sixty-five degrees centigrade.

*Table I*

| Example | $C_{10}Cl_{10}O$, Wt. Percent | $Sb_2O_3$, Wt. Percent | Heat Distortion Temp., °C. | Burning Characteristics |
|---|---|---|---|---|
| 5 | 0 | 0 | 54 | Burning rate: 0.7 inch/min. |
| 6 | 30 | 10 | 55 | Self-extinguishing in one to forty seconds. |

In the following examples, $C_{10}Cl_{10}O$ was incorporated into polyethylene of the type produced by the high pressure process and having a density of 0.92 gram per cc. The mixing method was the same as in the preceding examples except the mixing temperatures were one hundred and sixty-five and one hundred and seventy-three degrees centigrade for Examples 7 and 8, respectively.

*Table II*

| Example | $C_{10}Cl_{10}O$, Wt. Percent | $Sb_2O_3$, Wt. Percent | Heat Distortion Temp., °C. | Burning Characteristics |
|---|---|---|---|---|
| 7 | 0 | 0 | 42 | Burning rate: 0.9 inch/min. |
| 8 | 30 | 10 | 43 | Self-extinguishing in two to twenty-five seconds. |

In the following examples, $C_{10}Cl_{10}O$ was incorporated into emulsion-polymerized polystrene. The mixing method was the same as in the preceding examples except that the mixing temperature was two hundred and five degrees centigrade.

*Table III*

| Example | $C_{10}Cl_{10}O$, Wt. Percent | $Sb_2O_3$, Wt. Percent | Heat Distortion Temp., °C. | Burning Characteristics |
|---|---|---|---|---|
| 9 | 0 | 0 | 84-88 | Burning. |
| 10 | 30 | 0 | 88 | Self-extinguishing in six to twelve seconds. |
| 11 | 20 | 10 | 90 | Self-extinguishing in zero to one second. |

From the foregoing examples it is evident that the incorporation of the chlorinated compounds of this invention into hydrocarbon polymers imparts fire retardance to the polymer by slowing the burning rate in all cases, and by rendering the polymers self-extinguishing at the higher concentrations. The fire retardant characteristics of the compositions are further enhanced by also incorporating an antimony compound therein.

It was quite surprising to find that the incorporation of the additives of the instant invention into the polymers enhanced the thermal properties as exemplified by the heat distortion temperature, whereas it would normally be expected that such characteristics would be adversely affected. Additionally, it was found that the compositions of the invention have less tendency to drip in contact with a flame, thereby further reducing the hazard of using hydrocarbon polymers in industrial applications where the spreading of burning molten material can be a serious problem in the event of a fire.

In the foregoing examples, 0.25 ml. dibutyltin dilaurate was used as a heat stabilizer. It was found that this additive did not affect the properties other than appearance. It is also within the scope of the invention to use other heat stabilizers such as basic lead phosphite, basic lead carbonate and the like. Likewise other additives such as carbon black, colored pigments and the like can be utilized without departing from the spirit of the invention.

Having thus described my invention, I claim:

1. A fire retardant polymer composition comprising a polymer of an ethylenically unsaturated hydrocarbon and a compound selected from the group consisting of $C_{10}H_2O_3SCl_{12}$ $C_{10}Cl_{10}O$ and mixtures thereof, said $C_{10}H_2O_3SCl_{12}$ being the same compound as that which is formed by the reaction of chlorosulfonic acid with hexachlorocyclopentadiene at a temperature in the range of 30 to 170 degrees centigrade and said $C_{10}Cl_{10}O$ being the same compound as that which is prepared by treating said $C_{10}H_2O_3SCl_{12}$ with alcoholic alkali, followed by acidification, in sufficient proportion to improve the fire retardancy of the polymer composition.

2. The composition according to claim 1 wherein the polymer is polyethylene.

3. The composition according to claim 1 wherein the polymer is polypropylene.

4. The composition according to claim 1 wherein the polymer is polystyrene.

5. A composition according to claim 1 wherein said compound is $C_{10}Cl_{10}O$.

6. A fire retardant polymer composition comprising a polymer of an ethylenically unsaturated hydrocarbon, a compound selected from the group consisting of $C_{10}H_2O_3SCl_{12}$ $C_{10}Cl_{10}O$ and mixtures thereof, said $C_{10}H_2O_3SCl_{12}$ being the same compound as that formed by the reaction of chlorosulfonic acid with hexachlorocyclopentadiene at a temperature in the range of 30 to 170 degrees centigrade and said $C_{10}Cl_{10}O$ being the same compound as that prepared by treating said $C_{10}H_2O_3SCl_{12}$ with alcoholic alkali, followed by acidification, and an antimony compound, said compounds being present in sufficient proportion to improve the fire retardancy of the polymer composition.

7. The composition according to claim 6 wherein the antimony compound is antimony oxide.

8. A fire retardant polymer composition comprising a polymer of an ethylenically unsaturated hydrocarbon and a compound selected from the group consisting of $C_{10}H_2O_3SCl_{12}$ $C_{10}Cl_{10}O$ and mixtures thereof, said $C_{10}H_2O_3SCl_{12}$ having a melting range of 146 to 147 degrees centigrade and being the same compound as that which is made by reacting hexachlorocyclopentadiene with chlorosulfonic acid at a temperature in the range of 30 to 170 degrees centigrade, said $C_{10}Cl_{10}O$ being non-melting at temperatures up to 300 degrees centigrade and being the same compound as that which is prepared by treating said $C_{10}H_2O_3SCl_{12}$ with alcoholic alkali, followed by acidification, in sufficient proportion up to 50 percent by weight in the polymer composition to improve the fire retardancy of the polymer composition.

9. A fire retardant polymer composition according to claim 8 in which there is present about ten to about 50 percent by weight of said compound selected from the group consisting of $C_{10}H_2O_3SCl_{12}$, $C_{10}Cl_{10}O$ and mixtures thereof, and from one to 30 percent by weight of antimony oxide, said compound and antimony oxide being present in sufficient proportion to improve the fire retardancy of the polymer composition.

10. A method of imparting fire resistance to a polymer of an ethylenically unsaturated hydrocarbon which comprises heating the polymer to a molten state and incorporating therein a compound selected from the group consisting of $C_{10}H_2O_3SCl_{12}$, $C_{10}Cl_{10}O$ and mixtures thereof, said $C_{10}H_2O_3SCl_{12}$ being the same compound as that which is formed by the reaction of chlorosulfonic acid with hexachlorocyclopentadiene at a temperature in the range of 30 to 170 degrees centigrade and said $C_{10}Cl_{10}O$ being the same compound as that which is prepared by treating said $C_{10}H_2O_3SCl_{12}$ with alcoholic alkali, followed by acidification, in sufficient proportion to improve the fire retardancy of the polymer composition.

11. The method according to claim 10 wherein the polymer is polyethylene.

12. The method according to claim 10 wherein the polymer is polypropylene.

13. The method according to claim 10 wherein the polymer is polystyrene.

14. A method according to claim 10 wherein said compound is $C_{10}Cl_{10}O$.

15. A method of imparting fire resistance to a polymer of an ethylenically unsaturated hydrocarbon which comprises heating the polymer to a molten state and incorporating therein a compound selected from the group consisting of $C_{10}H_2O_3SCl_{12}$, $C_{10}Cl_{10}O$ and mixtures thereof, said $C_{10}H_2O_3SCl_{12}$ being the same compound as that which is formed by the reaction of chlorosulfonic acid with hexachlorocyclopentadiene at a temperature in the range of 30 to 170 degrees centigrade and said $C_{10}Cl_{10}O$ being the same compound as that which is prepared by treating said $C_{10}H_2O_3SCl_{12}$ with alcoholic alkali, followed by acidification, and an antimony compound, said compounds being present in sufficient proportion to improve the fire retardancy of the polymer composition.

16. The method according to claim 15 wherein the antimony compound is antimony oxide.

References Cited by the Examiner

UNITED STATES PATENTS

| | | | |
|---|---|---|---|
| 2,516,404 | 7/50 | McBee et al. | 260—503 |
| 2,588,362 | 3/52 | Danison. | |
| 2,590,211 | 3/52 | Rugar. | |
| 2,616,928 | 11/52 | Gilbert et al. | 260—543 |
| 2,669,521 | 2/54 | Bierly. | |
| 2,779,700 | 1/57 | Robitschek et al. | |
| 2,909,501 | 10/59 | Robitschek et al. | |
| 2,924,532 | 2/60 | Dereich. | |

LEON J. BERCOVITZ, *Primary Examiner.*

ALPHONSO D. SULLIVAN, *Examiner.*